United States Patent
Hursey (10) Patent No.: US 8,291,505 B2
(45) Date of Patent: Oct. 16, 2012

(54) DETECTING COMPUTER DATA CONTAINING COMPRESSED VIDEO DATA AS BANNED COMPUTER DATA

(75) Inventor: Neil John Hursey, Hertford Heath (GB)

(73) Assignee: McAfee, Inc., Santa Clara, CA (US)

( * ) Notice: Subject to any disclaimer, the term of this patent is extended or adjusted under 35 U.S.C. 154(b) by 1776 days.

(21) Appl. No.: 10/417,194

(22) Filed: Apr. 17, 2003

(65) Prior Publication Data

US 2004/0208319 A1 Oct. 21, 2004

(51) Int. Cl.
*G06F 21/00* (2006.01)
(52) U.S. Cl. .......................................................... 726/27
(58) Field of Classification Search ...................... None
See application file for complete search history.

(56) References Cited

U.S. PATENT DOCUMENTS

| | | | |
|---|---|---|---|
| 5,539,908 A * | 7/1996 | Chen et al. | 719/331 |
| 5,627,936 A * | 5/1997 | Prasad et al. | 386/253 |
| 7,017,187 B1 * | 3/2006 | Marshall et al. | 726/24 |
| 2003/0023736 A1 * | 1/2003 | Abkemeier | 709/229 |
| 2003/0037010 A1 * | 2/2003 | Schmelzer | 705/67 |
| 2003/0149890 A1 * | 8/2003 | Shen et al. | 713/200 |

OTHER PUBLICATIONS

Hlaina, Nwe Nwe Browser Security: A Requirements-based Approach Mar. 2003 pp. 1, 9, 17-19 and 81-87 http://sky.fit.qut.edu.au/~hlaings/thesis.pdf.*
Free On-Line Dictionary of Computing "Filename Extension "Apr. 19, 2002.*

* cited by examiner

*Primary Examiner* — David Pearson
(74) *Attorney, Agent, or Firm* — Patent Capital Group (57) ABSTRACT

Computer data containing compressed video data is examined to see if it is banned computer data, for example containing pirate or copyright-infringing video material, by examining the identifier of the video codec associated with the compressed video data. Certain video codec identifiers are highly correlated with the computer data concerned being banned computer data. Thus, an examination of the header file of the computer data may be used as an efficient and sensitive tool for identifying the computer data as banned computer data.

32 Claims, 5 Drawing Sheets

DETECTING COMPUTER DATA CONTAINING COMPRESSED VIDEO DATA AS BANNED COMPUTER DATA

BACKGROUND OF THE INVENTION

1. Field of the Invention

This invention relates to the field of data processing systems. In particular, this relates to the detection of computer data containing compressed video data as banned computer data, such as, for example, computer files or streamed computer data containing a copyright infringing movie.

2. Description of the Prior Art

It is known to provide malware scanners, which may for example be web access scanners, email scanners, on demand file scanners, on access file scanners and the like, that serve to detect malware within data being stored, received, manipulated or used in some other way. The threat posed by computer viruses is well known. It is also important in other circumstances, particularly to many businesses, that their computer systems should not be used in connection with improper, inappropriate or otherwise undesirable computer data. As an example, email scanners may be used to scan email traffic for the presence of words or phrase indicative of email messages which are abusive in some way or otherwise undesirable.

One type of undesirable computer data which it may be wished to exclude from a computer system is copyright infringing or otherwise unauthorised video data. It is well known that the Internet is a source for copyright infringing music files, such as MP3 files, which can be downloaded from many different sources. There has also arisen a problem with unauthorised and/or copyright infringing video data being distributed via the Internet and other mechanisms. There is often considerable interest in a new released movie and it is known for compressed versions of the video data of such movies to be made available for download via the Internet. These compressed versions are often pirate, copyright-infringing versions.

An individual or organisation may wish to prevent such pirated, copyright-infringing video data from being present on their computer system. It can be embarrassing, damaging and potentially actionable should such material circulate within a corporate network environment. In addition to this, the use of such a corporate network to manipulate this kind of material is an inappropriate use of the computing resources of the organisation and likely in contravention to company policy.

SUMMARY OF THE INVENTION

Viewed from one aspect the present invention provides a computer program product having a computer program for controlling a computer to detect computer data containing compressed video data as being banned computer data, said computer program product comprising:

identifier reading code operable to read from said computer data an identifier of a decoder operable to decompress said compressed video data;

identifier comparing code operable to compare said identifier with one or more predetermined characteristics indicative of whether said identifier is associated with banned computer data; and triggering code operable if said identifier is associated with banned computer data, to trigger a banned computer data action.

The invention recognises that a large proportion of banned computer data containing compressed video data uses distinctive decoders that are identified within the computer data and are different from the decoders that are typically used by legitimate computer data containing compressed video data. The banned versions typically tend to use higher degrees of compression than the legitimate versions of the material, so as to ease download or storage on conventional CDs. These higher degrees of compression rely upon their own non-standard decoders. Accordingly, identifying the decoder to be used with some compressed video data and comparing this with predetermined characteristics indicative of whether or not the decoder is associated with banned material is an efficient and effective way of identifying such material. The technique does not seek to characterise the decompressed video data itself, but rather takes the approach of characterising the decoder associated with that compressed video data. This is surprisingly effective and may be relatively readily implemented. Alternatives relying upon the decompression and examination of the compressed video data itself are much less efficient and prone to significant inaccuracies.

It will be appreciated that the computer data which is being examined for the presence of inappropriate or illicit material could take a variety of different forms. Some particular forms to which the present technique may be applied are when the computer data forms a computer file or a stream of transmitted data, such as is streamed to an Internet browser during live playback.

Whilst the identifier of the decoder could take a variety of forms, preferred embodiments of the invention are ones in which the identifier is a decoder identifying field embedded within the compressed video file. This is a relatively commonly used way of identifying the decoder and is particularly well suited to the present technique since the identification can be extracted from a known point with relatively little processing and overhead. Furthermore, this may be done upon receipt of only the first portion of the computer data concerned.

In the context of systems which tend to operate on a modular basis for improved flexibility, the decoder identifying field may be the key used by an operating system to associate the computer data concerned with a decoder registered to the operating system. Such a decoder can be used for various different purposes and accessed by any process in possession of the appropriate key identifying the decoder to be used.

The compressed video data can take a variety of forms, but the technique is well suited to systems in which the compressed video data is a video stream typically interleaved with other forms of data, such as audio and possibly text data.

The computer data may be in a variety of different formats such as an AVI file, an MPEG file, a MOV file, a Quicktime file, or a streamed data file format of some other form.

The predetermined characteristics may be identifiers, such as names or embedded code values and the like relating to decoders known to be associated with banned computer data. In such embodiments banned computer data actions may be triggered when such identifiers are detected.

As an alternative approach, possibly giving a higher degree of security at the cost of more false alarms, other embodiments can use identifiers of decoders associated with allowed computer data, e.g. known legitimate decoders, and trigger banned computer data actions if a match with a known allowed decoder is not found.

The computer data to be examined could take a variety of different forms. As an example, the computer data could be a computer file stored on a CD which it is desired to scan before use. However, the invention is particularly well suited to systems to which computer data is downloaded with an Internet link. The primary source of banned computer data of the type of addressed by the present technique is Internet downloaded computer data.

The present technique can be employed in a variety of different ways to detect banned computer data within a computer system. Particularly appropriate uses are within an Internet content scanner, an email scanner for scanning attached files, a stand only file scanner and applications such as on demand or on access scanners.

The banned computer data actions can take a variety of forms, which may be configured according to the requirements of the particular system, but typically include one or more of blocking access to the banned computer data, deleting the banned computer data, quarantining the banned computer data, generating an alert message to a user or Administrator, and replacing the banned computer data with computer data operable to generate a video message informing the user of the presence of the banned computer data.

It will be appreciated that the decoder is the element needed to decompress the decompressed video data. However, such decoders are commonly part of a codec computer program which both compresses and decompresses video data and the identifier concerned may be an identifier of the codec rather than specifically of the decoder.

Viewed from another aspect of the present invention provides a method of detecting computer data containing compressed video data as being banned computer data, said method comprising the steps of:

reading from said computer data an identifier of a decoder operable to decompress said compressed video data;

comparing said identifier with one or more predetermined characteristics indicative of whether said identifier is associated with banned computer data; and if said identifier is associated with banned computer data, then triggering a banned computer data action.

Viewed from a further aspect the present invention provides apparatus for detecting computer data containing compressed video data as being banned computer data, said apparatus comprising:

an identifier reader operable to read from said computer data an identifier of a decoder operable to decompress said compressed video data;

an identifier comparitor operable to compare said identifier with one or more predetermined characteristics indicative of whether said identifier is associated with banned computer data; and triggering logic operable if said identifier is associated with banned computer data, to trigger a banned computer data action.

The above and other objects, features and advantages of this invention will be apparent from the following detailed description of illustrative embodiments which is to be read in connection with the accompanying drawings.

DESCRIPTION OF THE PREFERRED EMBODIMENTS

Figure 1:
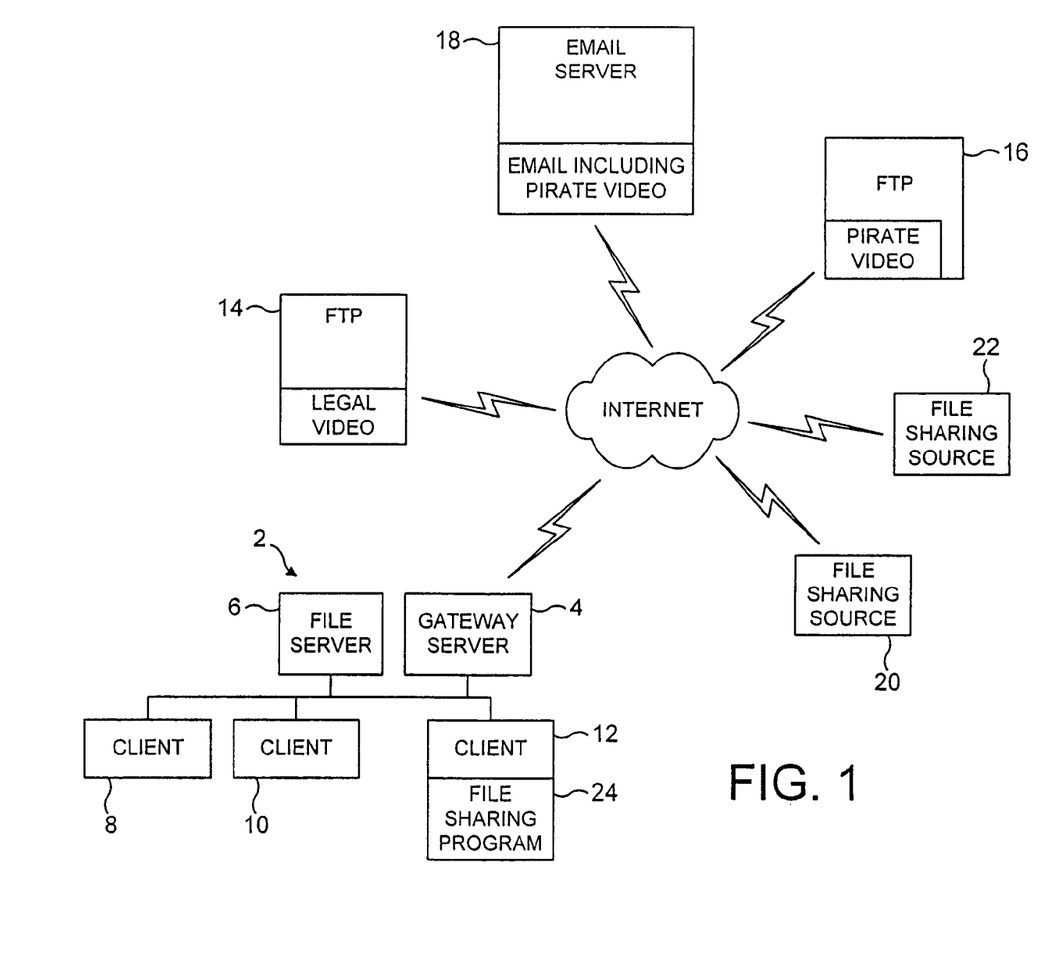
FIG. 1 schematically illustrates a computer system attached to the Internet and various sources of banned computer data.

FIG. 1 illustrates a computer network 2, such as a corporate computer network, comprising a gateway server 4, a file server 6 and a plurality of client computers 8, 10, 12. The network 2 is connected via the Internet to provide a plurality of sources of data. Some of these sources of data may be sources of legitimate data, such as an FTP server 14 containing a legal copy of a video file that can be downloaded and used by appropriately authorised persons connected by the Internet. Conversely, another FTP server 16 may store a copy which is a pirate, copyright-infringing version of the video concerned and which it is desired to prevent from being manipulated within the network 2. An email server 18 may serve as a source for the banned material, such as email messages containing the banned material as an email attachment. There are also known number of file sharing schemes whereby banned computer files, such as pirate, copyright-infringing versions of computer files are stored on a distributed collection of file sharing source computers 20, 22 which may be accessed by a file sharing client program 24 executing on a client computer. These file sharing schemes are difficult to combat since the source computers can rapidly appear and disappear and may themselves only store a portion of the banned computer file concerned. Furthermore, the central computer agency which co-ordinates the actively and allows users to identify where banned computer files are stored does not itself store those computer files.

The gateway server 4 of the network 2 typically includes an Internet content scanner for scanning Internet traffic going in and out of the network 2 for banned material. The gateway server 4 may also provide an email scanner for scanning inbound and outbound emails and their attachments. The file server 6 may incorporate an on-demand or on-access malware scanner checking for computer viruses, Trojans, worms and the like. The present technique can be used by one or more of the Internet content scanner, the email scanner, the on-access scanner or the on-demand scanner. The role of the present technique is to use a decoder identifier within computer data associated with compressed video data to determine whether or not the computer data is banned computer data.

Figure 2:
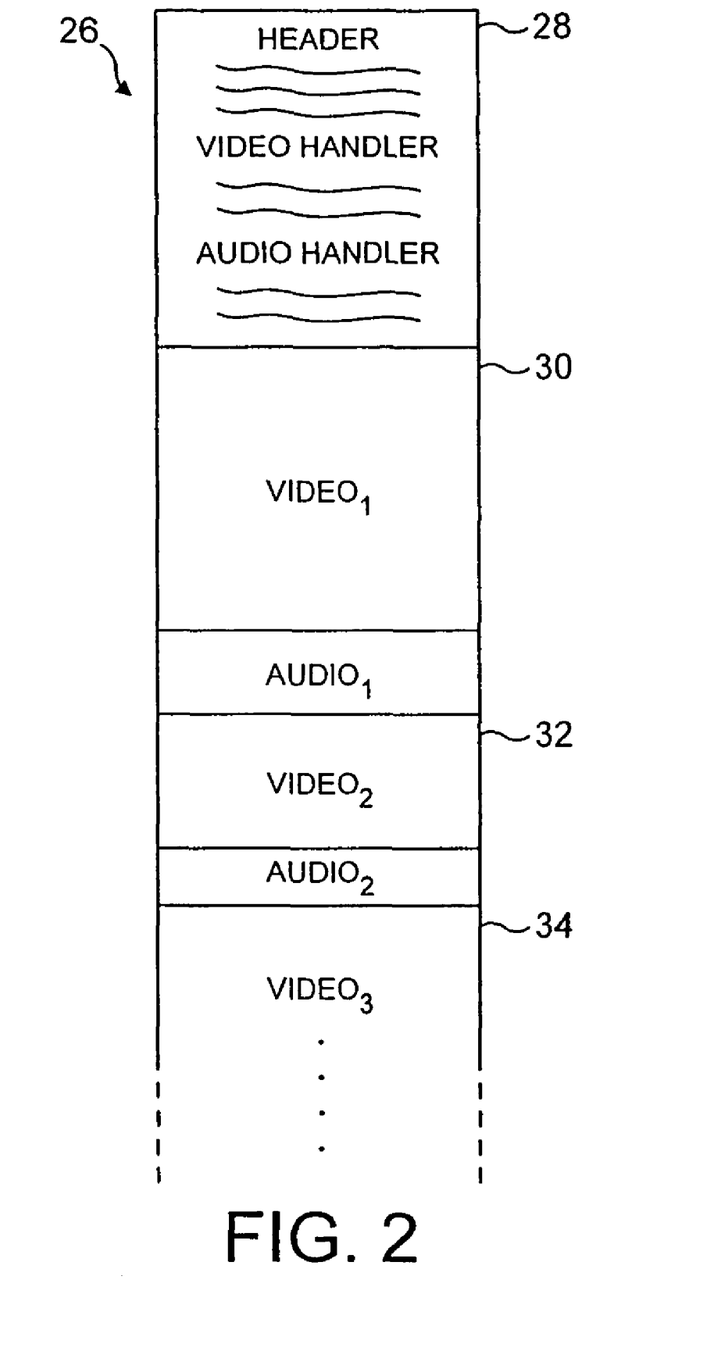
FIG. 2 schematically illustrates a computer file containing compressed video data.

FIG. 2 schematically illustrates a first portion of a computer file 26. This computer file 26 includes a header portion 28 which amongst other parameters specifies a key identifying a video codec to be used with the video data 30, 32, 34 within the computer file 26. An identifier for an audio codec may also be included. The structure of the computer file 26 can vary considerably depending upon the particular implementation. One known type of implementation is for AVI files. Details of this type of file may be found in the publicly available documentation, such as those guides produced for programmers wishing to develop software to interact with this file format. Other file formats with which the present technique may be used include MPEG files, MOV files, Quicktime files and other streamed data format files. It will be appreciated that the computer data upon which the present technique is used need not comprise a discrete computer file. As an example, it is known to stream compressed video data via a network link, such as an Internet link, to a video player. The video data may be a realtime video stream and this would not conventionally be considered to be a computer file, although it will at least normally be temporarily stored in the form of temporary computer files and the like.

Figure 3:
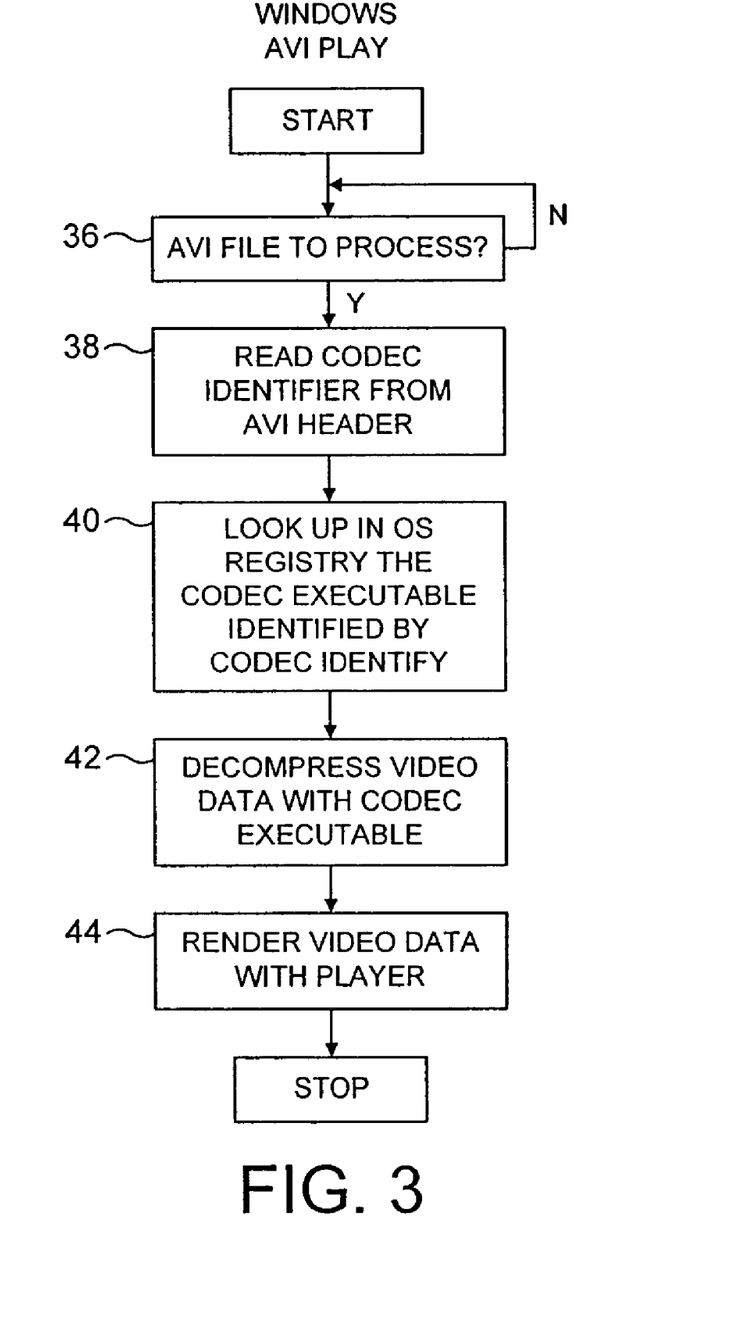
FIG. 3 is a flow diagram schematically illustrating the process of normal playback of a compressed video file.

FIG. 3 is a flow diagram schematically illustrating the normal way in which an AVI file which contains compressed video data may be read and played within the Windows operating system environment. At step 36 the system waits for an AVI file to be received. Other files may be received which are not AVI files and will not trigger processing in accordance with the techniques illustrated FIG. 3, but will instead by processed in accordance with there own different techniques. When an AVI file has been received for processing, step 38 reads the codec identifier from the AVI file header. Step 40 then uses this codec identifier, which may be a four character key value, to reference the operating system registry and thereby identify the codec executable file to be used to decompress the compressed video data within the AVI file. At step 42 the compressed video data is decompressed with the identified codec executable. At step 44 the decompressed video data is rendered with a player, such as by drawing to an appropriate portion of computer display. It will be appreciated that steps 42 and 44 may not be sequential and what will typically happen is that a portion of the compressed video data will be decompressed and then rendered in parallel with the next portion of the video data being decompressed such that a continuous decompressed stream of video data becomes available for rendering by the player and uninterrupted playback achieved without having to first decompress and store the entire video data concerned.

FIG. 3 describes a Windows AVI playback system. It will be appreciated that a wide variety of different playback systems are known and maybe utilised with the present technique. As an example, a particular video player may contain its own video codec and not need to reference this via a lookup to an operating system concerned registry. However, the computer data concerned would still include an identifier to indicate that the video data had been compressed this video codec. Compressed video data typically cannot be decompressed other than by the decompressor specifically intended for use with that compressed video data and using the decompression parameters associated with the codec and the data itself.

Figure 4:
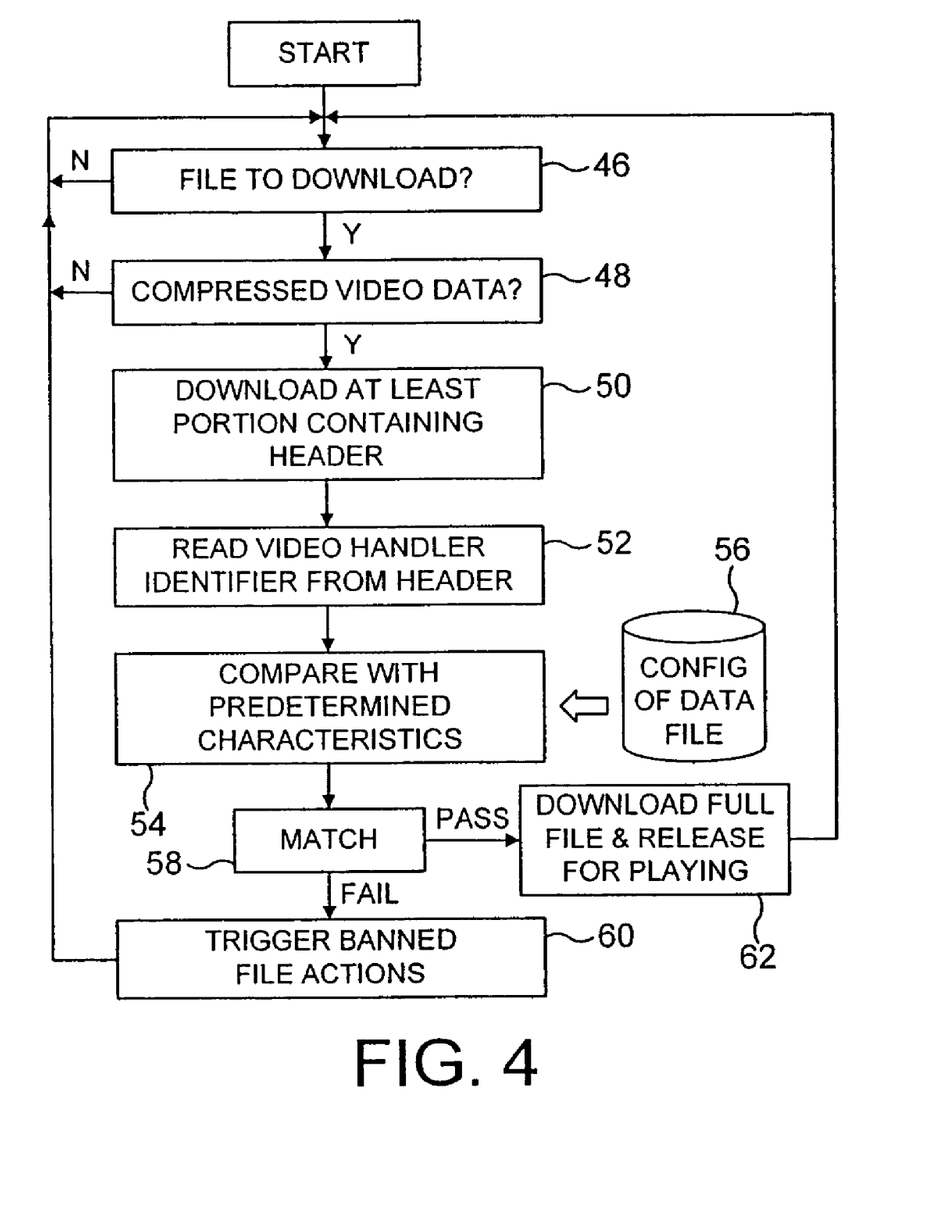
FIG. 4 is a flow diagram schematically illustrating the detection of banned computer data in accordance with the present technique.

FIG. 4 is a flow diagram schematically illustrating the present technique for detecting banned computer data containing, for example, copyright infringing compressed video data. At step 46 the system waits for a file to be downloaded. This particular example is related to an Internet content scanner, but modifications will be apparent to those in the field to adapt this technique to an email attachment scanner, an on-access scanner or an on-demand scanner as well as other possible uses.

When a file for download has been identified, step 48 determines whether this is a file containing compressed video data which needs to be checked in accordance with the present technique. If the file is not one containing compressed video data, then the thread illustrated in FIG. 4 need not be used and processing returns to step 46 to await the next file.

If the file being downloaded does contain compressed video data, then step 50 serves to download at least the header portion of that computer file. The complete computer file need not necessary be downloaded in order that it be scanned. This is useful since such computer files can be large and the resource wasted on downloading an entire computer file which was then to be banned would be disadvantageous. When at least the header has been downloaded, step 52 picks out the video handler identifier from the header.

At step 54, the read video handler identifier is compared with one or more predetermined characteristics. These predetermined characteristics can be hardcoded into the algorithm concerned or possibly read from a configuration file or data file 56 which may be set up by a user of the system or downloaded from a supplier of the system who keeps an up-to-date list of suspicious video handler identifiers. The predetermined characteristics may be characteristics of known suspicious video handler identifiers and a match with any of these will produce a fail result at step 58. Alternatively, the predetermined characteristics may be identifiers of known allowed video handlers and a lack of a match with one of these will trigger a fail result at step 58.

Step 58 performs the match test discussed above and generates either a pass or fail result. If the computer file containing compressed video data fails the test, then processing proceeds to step 60 at which the banned computer data actions are triggered, such as blocking access to that computer data, deleting that computer data, quarantining that computer data, generating an alert message, either to a user or an Administrator, or replacing the banned computer data with some other video data or generating a video message indicating that banned computer video data has been detected. After the banned file actions have been triggered, processing returns to step 46.

If the determination at step 58 was that the computer data was not banned, then processing proceeds to step 62 at which the full computer file is downloaded and released for playing in the normal way, such as in accordance with FIG. 3. Processing then returns to step 46.

As previously mentioned there are a number of video codecs that are known to be associated with banned computer data. Examples of these are the Divx codec and the Angel potion codec. Conversely, known legitimate codecs include the Indeo codec, I263 codec, MPEG codec and the like. Detection of banned computer data may be made by detecting the use of one of the known suspicious video codecs or by detecting the lack of use of one of the known legitimate codecs.

Figure 5:
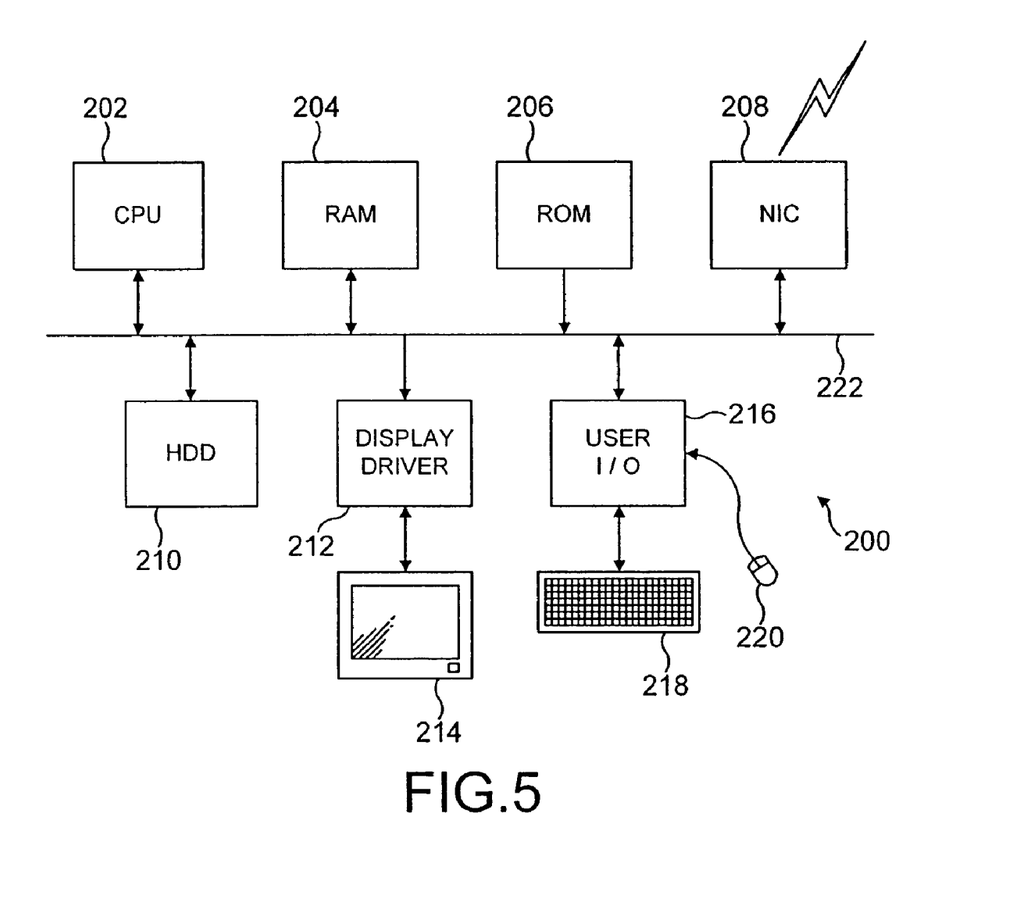
FIG. 5 is a diagram schematically illustrating the architecture of a general purpose computer for implementing the above described techniques.

FIG. 5 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 5 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product embodied on a non-transitory computer readable medium having a computer program, said computer program product comprising:
   identifier reading code operable to read from computer data an identifier of a decoder operable to decompress compressed video data included in said computer data, wherein header information of a computer file associated with the computer data is downloaded, but not the entire computer file before determining whether to stream the computer file;
   identifier comparing code operable to compare said identifier with one or more predetermined characteristics indicative of whether said identifier is associated with banned computer data; and
   triggering code operable if said identifier is associated with banned computer data, to trigger a banned computer data action,
   wherein said decoder identifying field is a key used by an operating system to associate said computer data with a decoder registered to said operating system, wherein the identifier of the decoder is compared against a list of authorized decoders such that if a match is not found on the list, the banned computer data action is triggered and the computer data is quarantined, and wherein the decoder is part of a video codec computer program that may be authorized for streaming the computer file.

2. A computer program product as claimed in claim 1, wherein said computer data includes a stream of transmitted data.

3. A computer program product as claimed in claim 1, wherein said computer data includes said compressed video data as a video stream within said computer data.

4. A computer program product as claimed in claim 3, wherein said computer data is one of:
   an AVI file;
   an MPEG file;
   a MOV file; and
   a streamed data format file.

5. A computer program product as claimed in claim 1, wherein said one or more predetermined characteristics are characteristics of one or more identifiers associated with banned computer data, said banned computer data action being triggered if said identifier matches said one or more predetermined characteristics.

6. A computer program product as claimed in claim 1, wherein said one or more predetermined characteristics are characteristics of one or more identifiers associated with allowed computer data, said banned computer data action being triggered if said identifier does not match said one or more predetermined characteristics.

7. A computer program product as claimed in claim 1, wherein said computer data is computer data downloaded with an Internet link.

8. A computer program product as claimed in claim 7, wherein said identifier reading code and said identifier comparing code are part of one or more of:
   an Internet content scanner;
   an email scanner; and
   a stand alone file scanner.

9. A computer program product as claimed in claim 1, wherein said banned computer data action comprises one or more of:
   blocking access to said banned computer data;
   deleting said banned computer data;
   generating an alert message; and
   replacing said banned computer data with computer data operable to generate a video message informing a user of said banned computer data.

10. A computer program product as claimed in claim 1, wherein said one or more predetermined characteristics are associated with known suspicious video handler identifiers.

11. A computer program product as claimed in claim 1, wherein said identifier reading code and said identifier comparing code are executed on a server.

12. A computer program product as claimed in claim 1, wherein said identifier of said decoder operable to decompress said compressed video data includes a four character key value that is used to reference an operating system registry to identify a codec executable file to be used to decompress said compressed video data.

13. A computer program product as claimed in claim 1, further comprising computer code for determining if said computer data is a file containing compressed video data.

14. A computer program product as claimed in claim 1, wherein a gateway server of a network includes said identifier reading code, said identifier comparing code, and said triggering code for scanning traffic going in and out of said network to a plurality of client computers for said banned computer data.

15. A method comprising:
   reading from computer data an identifier of a decoder operable to decompress compressed video data included in said computer data, wherein header information of a computer file associated with the computer data is downloaded, but not the entire computer file before determining whether to stream the computer file;
   comparing said identifier with one or more predetermined characteristics indicative of whether said identifier is associated with banned computer data; and
   if said identifier is associated with banned computer data, then triggering a banned computer data action,
   wherein said decoder identifying field is a key used by an operating system to associate said computer data with a decoder registered to said operating system, wherein the identifier of the decoder is compared against a list of authorized decoders such that if a match is not found on the list, the banned computer data action is triggered and the computer data is quarantined, and wherein the decoder is part of a video codec computer program that may be authorized for streaming the computer file.

16. A method as claimed in claim 15, wherein said computer data includes a stream of transmitted data.

17. A method as claimed in claim 15, wherein said computer data includes said compressed video data as a video stream within said computer data.

18. A method as claimed in claim 17, wherein said computer data is one of:
   an AVI file;
   an MPEG file;
   a MOV file; and
   a streamed data format file.

19. A method as claimed in claim 15, wherein said one or more predetermined characteristics are characteristics of one or more identifiers associated with banned computer data, said banned computer data action being triggered if said identifier matches said one or more predetermined characteristics.

20. A method as claimed in claim 15, wherein said one or more predetermined characteristics are characteristics of one or more identifiers associated with allowed computer data, said banned computer data action being triggered if said identifier does not match said one or more predetermined characteristics.

21. A method as claimed in claim 15, wherein said computer data is computer data downloaded with an Internet link.

22. A method as claimed in claim 21, wherein said steps of reading and comparing are performed by one or more of:
   an internet content scanner;
   an email scanner; and
   a stand alone file scanner.

23. A method as claimed in claim 15, wherein said banned computer data action comprises one or more of:
   blocking access to said banned computer data;
   deleting said banned computer data;
   generating an alert message; and
   replacing said banned computer data with computer data operable to generate a video message informing a user of said banned computer data.

24. An apparatus, comprising:
   a non-transitory computer readable medium;
   an identifier reader operable to read from computer data an identifier of a decoder operable to decompress compressed video data included in said computer data, wherein header information of a computer file associated with the computer data is downloaded, but not the entire computer file before determining whether to stream the computer file;
   an identifier comparator operable to compare said identifier with one or more predetermined characteristics indicative of whether said identifier is associated with banned computer data; and
   triggering logic operable if said identifier is associated with banned computer data, to trigger a banned computer data action,
   wherein said decoder identifying field is a key used by an operating system to associate said computer data with a decoder registered to said operating system, wherein the identifier of the decoder is compared against a list of authorized decoders such that if a match is not found on the list, the banned computer data action is triggered and the computer data is quarantined, and wherein the decoder is part of a video codec computer program that may be authorized for streaming the computer file.

25. The apparatus as claimed in claim 24, wherein said computer data includes a stream of transmitted data.

26. The apparatus as claimed in claim 24, wherein said computer data includes said compressed video data as a video stream within said computer data.

27. The apparatus as claimed in claim 26, wherein said computer data is one of:
   an AVI file;
   an MPEG file;
   a MOV file; and
   a streamed data format file.

28. The apparatus as claimed in claim 24, wherein said one or more predetermined characteristics are characteristics of one or more identifiers associated with banned computer data, said banned computer data action being triggered if said identifier matches said one or more predetermined characteristics.

29. The apparatus as claimed in claim 24, wherein said one or more predetermined characteristics are characteristics of one or more identifiers associated with allowed computer data, said banned computer data action being triggered if said identifier does not match said one or more predetermined characteristics.

30. The apparatus as claimed in claim 24, wherein said computer data is computer data downloaded with an Internet link.

31. The apparatus as claimed in claim 24, wherein said identifier reading code and said identifier comparing code are part of one or more of:
   an internet content scanner;
   an email scanner; and
   a stand alone file scanner.

32. The apparatus as claimed in claim 24, wherein said banned computer data action comprises one or more of:
   blocking access to said banned computer data;
   deleting said banned computer data;
   generating an alert message; and
   replacing said banned computer data with computer data operable to generate a video message informing a user of said banned computer data.

* * * * *